United States Patent Office 3,189,614
Patented June 15, 1965

3,189,614
3-HYDROXY-4-HYDROCARBON-5-TERTIARY AMINO TRIAZOLES AND PROCESS FOR THEIR PREPARATION
Marcel Pesson, Paris, France, assignor to Société anonyme dite: Laboratoire Roger Bellon, Neuilly-sur-Seine, France, a French company
No Drawing. Filed Aug. 4, 1961, Ser. No. 129,231
Claims priority, application Great Britain, Aug. 16, 1960, 28,409/60; Jan. 23, 1961, 2,670/61
7 Claims. (Cl. 260—308)

This invention relates to 3-hydroxy-(and 3-mercapto)-4-hydrocarbon-5-tertiary amino-1,2,4-triazoles and to a process for the preparation thereof.

The compounds provided by the invention correspond to the following formula:

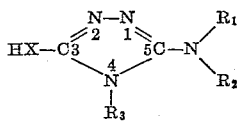

in which X represents oxygen or sulfur, $R_1$ and $R_2$ represent alkyl, which may be members of a ring which may contain hetero atoms, $R_3$ represents a substituted or unsubstituted aryl or cycloalkyl.

The new derivatives are particularly interesting because of their depressive action on the central nervous system; in addition, the 3-mercapto-4-aryl-5-dialkylamino-1,2,4-triazoles can be used in the photographic field.

The present invention also provides a process for the preparation of the above compounds which process comprises reacting an alkyl hydrazino carbonate or hydrazino dithiocarbonate of the formula

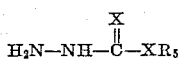

($R_5$ being alkyl having a small number of carbon atoms) with a urea derivative of the formula

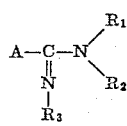

in which A represents either a radical —S—$R_4$ ($R_4$ being alkyl comprising a small number of carbon atoms) or the radical —O—$SO_2$—$C_2H_5$, and cyclizing the reaction product in alkaline medium in order to obtain the triazole derivative.

In a first embodiment of this process, initially thiourea compounds of the formula:

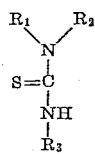

are used, the isothiouronium salts of which, on boiling in a solvent in the presence of an alkyl hydrazino carbonate or an alkyl hydrazino dithiocarbonate, yield amino guanidine derivatives, which are cyclized in alkaline medium to yield the desired triazole derivatives.

Such a reaction takes place in accordance with the following reaction scheme:

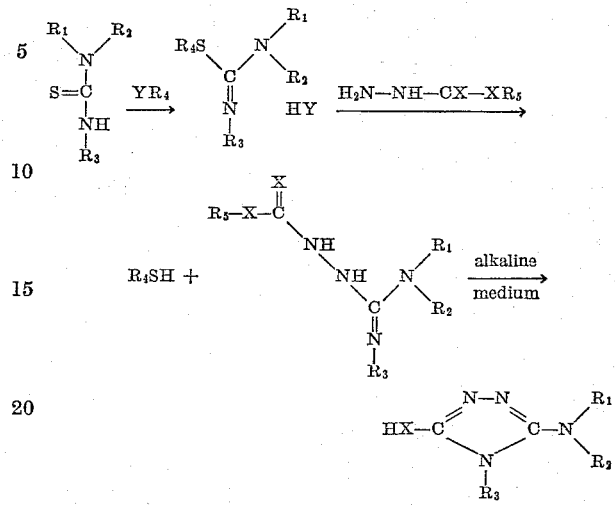

In this reaction scheme, the formula $YR_4$ represents a mineral ester of a lower fatty alcohol (Y thus representing a mineral acid radical and $R_4$ alkyl having a small number of carbon atoms). For instance, neutral methyl sulfate can be used in a proportion of one molecule of sulfate per molecule of thiourea.

In the diagram, the radical $R_5$ represents alkyl having a small number of carbon atoms, preferably methyl or ethyl. Ethyl will preferably be most frequently employed, but nevertheless, when X represents sulfur, it is possible to obtain a better yield, by carrying out the condensation of isothiourea in the basic state with methyl hydrazino dithiocarbonate.

In order to carry out the reaction in accordance with the above-given reaction scheme, the alkyl ester, such as methyl sulfate, may be added to the finely divided thiourea whereupon the mixture is gently heated so as to initiate the reaction, which usually is quite vigorous. When the reaction is partly completed, the resulting viscous product is taken up in an alcohol with a boiling point between 80° C. and 150° C. and the mixture is treated under reflex to complete the reaction.

The alkyl hydrazino carbonate or hydrazino dithiocarbonate is then added at the rate of at least one molecule per molecule of the thiourea being used.

The mixture is then kept under reflux for several hours and alkyl mercaptan is liberated. Depending on conditions, boiling must be continued for a period of 4 hours to 18 hours. The solvent is then driven off, for instance, under vacuum, and the usually viscous residue is taken up in water, in which it is dissolved. Any oily insoluble product which may have been formed is removed, for instance, by filtration in the presence of animal charcoal, or by extraction using a suitable solvent.

The aqueous solution is made alkaline, preferably by the addition of ammonia, and the resulting amino guanidine derivative is precipitated in the form of an oil which crystallizes on standing at low temperature. If the amino guanidine derivative does not crystallize, the crude product can be used for the following process steps.

Cyclization is achieved by boiling the amino guanidine derivative with a solution of an alkaline base, using at least one molecule of base to one molecule of the amino guanidine derivative. It is preferred to use an excess of substantially two molecules of base per molecule of the amino guanidine derivative. During heating, the derivative dissolves and the resulting final compound may be isolated by acidifying the solution by means of a weak acid, such as acetic acid.

In order to facilitate the isolation of the final compound, it is possible first of all to make the solution clearly acid, in order to cause re-dissolution of the initially precipitated final compound; the filtered solution is then made weakly alkaline, preferably by means of ammonia. Thereby, the final compound precipitates. It can be centrifuged and recrystallized.

This method is sometimes rather complicated, particularly because of the difficulties in isolating the intermediate amino guanidine and, as a result thereof, the yields of hydroxy triazole (or mercapto triazole) are lowered.

According to one feature of this first embodiment of the process, the intermediate S-alkyl isothiourea is isolated in the basic state and the following stages of the process are carried out simultaneously by heating the S-alkyl isothiourea and the alkyl hydrazino carbonate (or hydrazino dithiocarbonate) at 120–150° C. in the presence of an acid condensation agent.

The $N_1$, $N_2$-trisubstituted S-alkyl isothioureas, particularly the S-methylated derivatives, are prepared very easily in yields between 80% and 90%. They are most frequently obtained in the form of oils which can be purified by distillation in a vacuum. It may happen that these oils cannot be distilled without decomposition, but it is then possible to obtain them with a degree of purity sufficient for subsequent cyclization in a good yield. Certain S-methyl isothioureas are solid and can thus be purified by recrystallization.

Condensation of the S-alkyl isothioureas and of the alkyl hydrazino carbonate (or hydrazino dithiocarbonate) is achieved by heating the two substances together at a temperature between 120° C. and 150° C. Study of this reaction has shown that the condensation proceeds unsatisfactorily with small yields if the reagents are reacted as such. On the other hand, in the presence of an acid agent, the yield obtained on condensation is always good. In this case, acetic acid is preferably used.

In such a process, the mixture of S-methyl isothiourea, ethyl hydrazino carbonate and acetic acid can progressively be heated, these three compounds being present in substantially equimolecular proportions, but preferably the last two compounds are used in slight excess, preferably of the order of 10%. The reaction starts at a temperature of about 110° C. to 120° C. and is characterized by an abundant release of methyl mercaptan. The main part of the reaction is practically finished at 120° C. within one hour. In order to complete the reaction, this temperature is maintained for 5 hours to 8 hours, depending on circumstances. The resulting hydroxy triazole is isolated after cooling by taking up the reaction product, usually a solid mass, by means of an alkaline solution, in which the hydroxy triazole dissolves. Small quantities of insoluble impurities can be eliminated either by filtration in the presence of animal charcoal or by extraction by means of a suitable solvent.

The triazole derivative is precipitated by acidification with a weak acid, such as acetic acid, and is recrystallized. Under these conditions, the yields are never below 60% and are frequently between 80% and 90%.

By using methyl hydrazino dithiocarbonate instead of ethyl hydrazino carbonate, it is readily possible to prepare by the same process the 3-mercapto-5-dialkylamino-1,2,4-triazoles substituted in 4-position.

In a second embodiment of the process of this invention, it is possible to start with urea compounds and to react them with benzene sulfochloride at a low temperature in chloroform and in the presence of tertiary bases or of pyridine bases. In this way, a benzene sulfonic ester of an isourea compound corresponding to the initial product is obtained. This isourea compound can then be reacted with an alkyl hydrazino carbonate and more particularly ethyl hydrazino carbonate, which yields a carbethoxy amino guanidine which is finally cyclized in alkaline medium, as indicated above.

Such a process can only be used when X of the general formula given above corresponds to oxygen.

The invention is further illustrated by the following examples:

EXAMPLE 1

3-hydroxy-4-phenyl-5-diethylamino-1,2,4-triazole

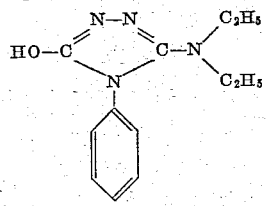

A solution is prepared containing:

$N_1$-diethyl-$N_2$-phenyl urea (⅛ mole) _____g__ 24
Anhydrous pyridine _____cc__ 20
Anhydrous chloroform _____cc__ 40

The solution is stirred and cooled externally with iced water. 22.5 g. of benzene sulfochloride are added drop by drop thereto in such a manner that the temperature of the mixture remains between 20° C. and 25° C. The mixture is stirred for three more hours at room temperature. 16 g. of ethyl hydrazino carbonate are then added and stirring is continued for another hour at room temperature.

The solution is extracted twice with 100 cc. of iced 2 N sodium hydroxide solution; it is washed with water and dried over magnesium sulfate. The solvent is evaporated and a viscous residue remains which is treated with 100 cc. of 2 N sodium hydroxide solution and then heated for 4 hours under reflux.

After cooling, an insoluble oil is extracted with ether and the alkaline solution is acidified with acetic acid (12 cc.). The precipitate is centrifuged and dried yielding 8.5 g. of the reaction product.

It is purified by recrystallization from water or cyclohexane; the melting point of the compound is 103–104° C.

Analysis for $C_{12}H_{16}N_4O$ (232.3): Calculated percent—C=62.05, H=6.94, N=24.12. Found percent—C=62.42, H=7.28, N=24.32.

EXAMPLE 2

3-hydroxy-4-phenyl-5-diethylamino-1,2,4-triazole

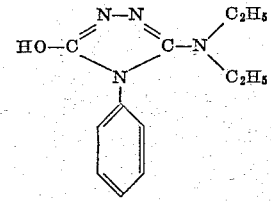

A solution of 58 g. of $N_1$-phenyl-$N_2$-diethyl thiourea in 100 cc. of methanol is stirred vigorously in a flask equipped with a mechanical stirrer, a reflux condenser, and a dropping funnel and 41 g. of methyl sulfate are quickly added by way of a dropping funnel. The reaction is violent (boiling of the solvent). Stirring is continued and the reaction mixture is allowed to cool to room temperature. An equal volume of water is added to the solution and a light insoluble substance is extracted with ether. The aqueous phase is made alkaline with ammonia, the precipitated oil is extracted with ether, the ethereal extract is dried over anhydrous potassium carbonate, the solvent is removed and the remaining oil is subjected to fractional distillation in vacuo. 53 g. of N₁-phenyl-N₂-diethyl-S-methyl isothiourea are obtained which boils at 120° C./1.5 mm., the yield thus being 87%.

110 g. of the N₁-phenyl-N₂-diethyl-S-methyl isothiourea (½ mole), 61 g. of ethyl hydrazino carbonate (½ mole+20%), and 35 cc. of acetic acid are heated at 120–130° C. for 6 hours. After cooling, the viscous mass, triturated with 200 cc. of water, crystallizes. The solid is centrifuged and washed with water. The crude product (117 g.) is taken up in an alkaline solution (NaOH: 40 g., water: 1 liter), the mixture is boiled under reflux; the alkaline solution is filtered in the presence of animal charcoal and, while it is still hot, is acidified with 75 cc. of acetic acid. After cooling, the solid is centrifuged, washed in water and dried. There are thus obtained 92 g. of the reaction product, i.e. with a yield of 79%. After recrystallization from a mixture of benzene and cyclohexane, the compound melts at 104° C.; this compound is identical with the 3-hydroxy-4-phenyl-5-diethyl amino-1,2,4-triazole described in Example 1.

EXAMPLE 3

24.9 g. of neutral methyl sulfate are added to 41 g. of finely powdered N₁-phenyl-N₂-diethyl thiocarbamide. As soon as the violent reaction has subsided, the resulting viscous mass is dissolved in 50 cc. of alcohol. It is heated under reflux for 3½ hours, 21 g. of ethyl hydrazino carbonate are added, and heating under reflux is continued for another 3 hours whereafter the solvent is driven off in vacuo.

The residue is taken up in 400 cc. of water, the solution is filtered in the presence of animal charcoal to remove a small amount of insoluble product. The solution, made alkaline with ammonia, yields an oil which crystallizes on standing. The resulting precipitate (42 g.) is centrifuged and recrystallized from a mixture of petroleum ether (200 cc.) and ethyl acetate (50 cc.).

The melting point of said compound is 96–97° C.

The percentage composition of this product corresponds to that of N₁-phenyl-N₂-diethyl-N₃-carbethoxy amino guanidine, the formula of which is:

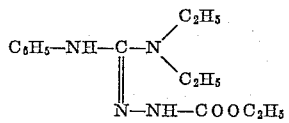

Analysis for C₁₄H₂₂N₄O₂ (278.35): Calculated percent—C=60.41, H=7.97, N=20.13. Found percent—C=60.82, H=8.14, N=20.07.

5.7 g. of this compound and 5 cc. of 2 N sodium hydroxide solution are kept under reflux for one hour. The limpid solution is cooled and acidified with acetic acid. The resulting precipitate (4 g., i.e. a yield of 82%) is centrifuged and purified by recrystallization from cyclohexane.

The melting point of the compound is 104° C. The compound is identical with the 3-hydroxy-4-phenyl-5-diethylamino-1,2,4-triazole of Example 1.

EXAMPLE 4

*3-hydroxy-4-phenyl-N-5-pentamethylene amino-1,2,4-triazole*

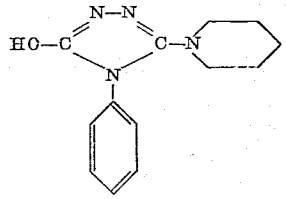

The following mixture is prepared:

Phenyl carbamyl piperidine (½₀ mole) _____g__ 9.6
Chloroform _____cc__ 40
Pyridine (½₀ mole) _____cc__ 8

The mixture is stirred and cooled in water. A solution comprising:

Benzene sulfochloride (½₀ mole) _____g__ 8.8
Chloroform _____cc__ 40 is added thereto dropwise within about 30 minutes.

The addition is so conducted that the temperature of the reaction mixture is kept between 20° C. and 25° C. The urea progressively dissolves. Stirring is carried out for 2 hours at ambient temperature whereafter a solution comprising:

Ethyl hydrazino carbonate _____g__ 7
Chloroform _____cc__ 20 is added dropwise within half an hour.

The mixture is stirred at room temperature for 3 hours.

The solution is extracted three times with 50 cc. of iced N sodium hydroxide solution, washed with water, and extracted with 100 cc. of 2.5 N hydrochloric acid. The acid solution, made alkaline with ammonia, yields a precipitate which melts at 156–158° C. after being recrystallized from methanol. The percentage composition of this product is in accordance with that of N₁-phenyl-N₂-pentamethylene-N₃-carbethoxy amino guanidine:

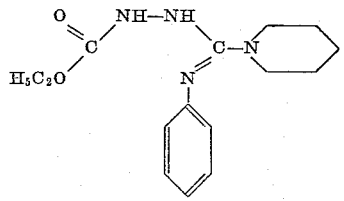

Analysis for C₁₅H₂₂N₄O₂ (290.36): Calculated percent—C=62.04, H=7.64, N=19.3. Found percent—C=61.94, H=7.68, N=19.69.

11 g. of the above-mentioned carbethoxy amino guanidine and 50 cc. of 2 N sodium hydroxide solution are heated under reflux for one hour. During the first 15 minutes, the sparingly soluble sodium hydroxy triazole salt crystallizes. Water is added to cause dissolution, whereafter the product is filtered and acidified with acetic acid (6 cc.). The precipitate is centrifuged, washed with water, and dried. 8.5 g. of a product are obtained, which is purified by recrystallization from 50% methanol.

The melting point of said compound is 192° C.; its analysis conforms to that of 3-hydroxy-4-phenyl-N-5-piperidino-1,2,4-triazole.

Analysis for C₁₃H₁₆N₄O (244.3): Calculated percent—C=63.9, H=6.6, N=22.94. Found percent—C=64.1, H=6.64, N=22.81.

EXAMPLE 5

The following mixture is prepared:

Phenyl thiocarbamyl piperidine (½₀ mole) _____g__ 11
Alcohol _____cc__ 30 to which are added:

Methyl sulfate (½₀ mole) _____g__ 5.3

The mixture is heated under reflux for one hour and then there are added: Ethyl hydrazino carbonate, 5.5 g. (½₀ mole+10%).

After boiling under reflux for 3 hours, the solution is evaporated to dryness in vacuo and the viscous residue is dissolved in water. Filtration takes place in the presence of animal charcoal in order to remove a light, oily, insoluble product. The solution, made alkaline with ammonia, gives an oily precipitate which crystallizes on cooling and scratching.

10.1 g. are obtained, i.e. in a yield of 70%, and this compound, after recrystallization, has a melting point of 159° C.; it is identical with the $N_1$-phenyl-$N_2$-pentamethylene-$N_3$-carbethoxy amino guanidine of Example 4.

EXAMPLE 6

As in Example 4, a solution comprising:

| | |
|---|---|
| Benzene sulfochloride _____g__ | 11.8 |
| Chloroform _____cc__ | 20 | is caused to react at a temperature between 20° C. and 27° C. with a suspension containing:

| | |
|---|---|
| N-phenyl carbamyl morpholine (1/20 mole) ___g__ | 10.3 |
| Pyridine _____cc__ | 13.2 |
| Chloroform _____cc__ | 40 |

After stirring at room temperature for 2½ hours, the following solution is added while stirring:

| | |
|---|---|
| Ethyl hydrazino carbonate (excess: 5%) _____g__ | 8 |
| Chloroform _____cc__ | 40 |

During the addition, the temperature rises to 37° C. After the usual treatment, there are obtained 5.5 g. of a crude product which is purified by recrystallization from 50% methanol. This product melts at 151–152° C.

The anlysis conforms to the following formula of $N_1$-phenyl-$N_2$-diethylene oxy-$N_3$-carbethoxy amino guanidine.

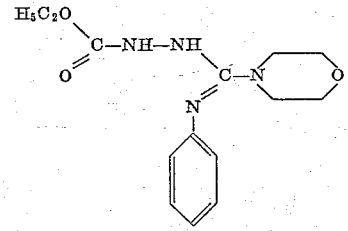

Analysis for $C_{14}H_{20}N_4O_3$ (292.23): Calculated percent —C=57.52, H=6.9, N=19.7. Found percent—C=57.38, H=6.96, N=19.29.

EXAMPLE 7

The following mixture is prepared:

| | |
|---|---|
| Phenyl thiocarbamyl morpholine (1/20 mole) ____g__ | 22 |
| Methanol _____cc__ | 60 |
| Methyl sulfate _____cc__ | 10 |

The mixture is heated under reflux for 2 hours whereupon another cc. of methyl sulfate is added and heating is continued for 3 hours; 14 g. of ethyl hydrazino carbonate are added and the mixture is kept under reflux for 2½ hours. The solvent is driven off in vacuo, the residue is dissolved in 200 cc. of water; the solution is filtered in the presence of animal charcoal and is made alkaline with ammonia. An oily precipitate crystallizes and is recrystallized from methanol. 20.3 g. of a compound (i.e. a yield of 70%) are obtained, this compound melting at 152–153° C. It is identical with the compound of Example 6.

EXAMPLE 8

*3-hydroxy-4-phenyl-N-5-morpholino-1,2,4-triazole*

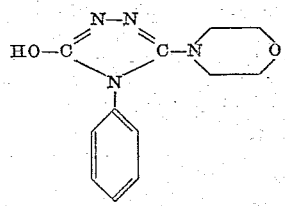

The mixture of 20.3 g. of $N_1$-phenyl-$N_2$-diethylene oxy-$N_3$-carbethoxy amino guanidine and 75 cc. of 2 N sodium hydroxide solution is heated under reflux for 2 hours. The limpid solution is acidified with acetic acid and the precipitate is centrifuged and washed with water.

13.8 g. of a product are obtained which is purified by recrystallization from ethyl acetate.

The purified compound melts at 220° C.

Analysis for $C_{12}H_{14}N_4O_2$ (246): Calculated percent— C=58.52, H=5.73, N=22.75. Found percent—C=58.5, H=5.51, N=22.79.

EXAMPLE 9

*3-hydroxy-4-phenyl-5-dibutylamino-1,2,4-triazole*

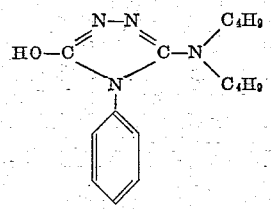

7 g. of neutral methyl sulfate are added to a solution consisting of:

| | |
|---|---|
| $N_1$-phenyl-$N_2$-dibutyl thiourea _____g__ | 13.2 |
| Methanol _____cc__ | 30 |

The mixture is heated under reflux for 2 hours; the solvent is driven off in vacuo and the residue is taken up in water. The solution, filtered in the presence of animal charcoal (in order to remove an oily product) is made alkaline with ammonia. The oil which precipitates is extracted with ether; the solution, dried over magnesium sulfate and after evaporation of the solvent, leaves a viscous residue which cannot be crystallized, is treated with 40 cc. of 2 N sodium hydroxide solution, and is kept under reflux for 4 hours. The solution is filtered by means of animal charcoal in order to remove an oily fraction. By acidification, the triazole is precipitated and recrystallized from petroleum ether. 5.3 g. (i.e. a yield of 37.6%) of a product melting at 90° C. are obtained.

Analysis of $C_{16}H_{24}N_4O$ (288.4): Calculated percent— C=66.63, H=8.39, N=19.43. Found percent— C=66.75, H=8.47, N=19.63.

The $N_1$-phenyl-$N_2$-dibutyl thiourea (melting point: 85–87° C.) required for the preparation of this compound is obtained by reaction of phenyl isothiocyanate with N-dibutylamine.

EXAMPLE 10

*3-hydroxy-4-phenyl-5-dibutylamino-1,2,4-triazole*

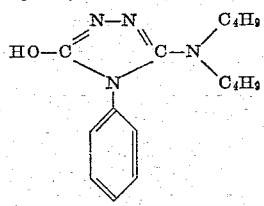

A suspension of 19 g. of $N_1$-phenyl-$N_2$ dibutyl-thiourea in 20 cc. of water is vigorously stirred and 10 g. of methyl sulfate are added dropwise. The suspension is refluxed until the thiourea dissolves, and boiling is continued for one more hour. The solution is made alkaline by adding ammonia. The precipitated oil is extracted with ether, the etherreal solution is dried over potassium carbonate; the solvent is distilled off and the oily residue is subjected to fractional distillation in vacuo. 19 g. (95%) of $N_1$-phenyl-$N_2$-dibutyl-S-methyl isothiourea are obtained. Boiling point: 168° C./2.5 mm.

A mixture of 19 g. of $N_1$-phenyl-$N_2$-dibutyl-S-methyl isothiourea, 8 g. of ethyl hydrazino carbonate (1 mole+10%) and 4.8 cc. of acetic acid is heated on an oil bath in a flask equipped with a reflux condenser. When the temperature of the bath reaches 130° C., a lively reaction occurs with release of methyl mercaptan. The bath temperature is kept at 130–150° C. for 8 hours. After cooling, the viscous mass is taken up, while hot, in 100 cc. of 7% sodium hydroxide solution. After filtering on animal charcoal in order to remove a light, insoluble substance, the solution, while still hot, is acidified with acetic acid. The precipitated oil crystallizes on cooling. The crystals are centrifuged, washed with water, and dried. 17 g. of the desired compound are thus obtained, i.e. the yield is 86%; this compound melts at 90° C., after recrystallization from petroleum ether.

EXAMPLE 11

*3-hydroxy-4-p-ethoxy phenyl-5-dimethylamino-1,2-4-triazole*

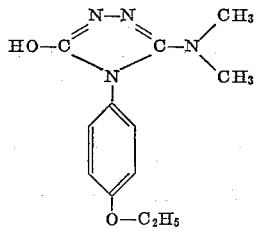

12 g. of neutral methyl sulfate are added to 16.7 g. of $N_1$-p-ethoxy phenyl-$N_2$-dimethyl thiourea while stirring, a violent reaction taking place thereby. When the mixture has cooled to room temperature, 30 c. of methanol are added, the mixture is heated for 2 hours under reflux to complete the reaction, and 10 g. of ethyl hydrazino carbonate are added; it is kept under reflux for 2 hours, the solvent is driven off in vacuo, the residue is taken up in 100 cc. of water, and the solution is filtered on animal charcoal to remove an insoluble oil.

The aqueous solution is made alkaline and yields an oil which is extracted with ether. The organic solution is dried over magnesium sulfate. After the solvent has been driven off, a viscous residue is obtained which cannot be crystallized and which is taken up in 20 cc. of 2 N sodium hydroxide solution. This mixture is then heated under reflux for 3 hours, the turbid solution is treated with animal charcoal, filtered, and then acidified with acetic acid. The precipitate is centrifuged, washed in water, and dried in a vacuum over phosphorous pentoxide. 7.9 g. of the desired reaction product are obtained.

After being recrystallized three times from ethyl acetate, the 3-hydroxy-4-p-ethoxy phenyl-5-dimethylamino-1,2,4-triazole melts at 161° C.

Analysis for $C_{12}H_{16}N_4O_2$ (248.28): Calculated percent—C=58.05, H=6.5, N=22.57. Found percent—C=57.96, H=6.38, N=22.46.

EXAMPLE 12

*3-hydroxy-4-p-ethoxy phenyl-5-diethylamino-1,2,4-triazole*

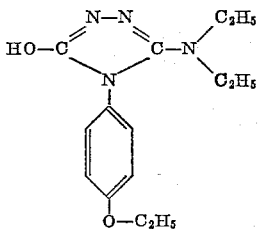

As in Example 11, 18 g. of $N_1$-p-ethoxy-phenyl-$N_2$-diethyl thiourea and 11 g. of neutral methyl sulfate are mixed. As soon as the reaction has subsided, 25 cc. of methanol are added, the mixture is heated under reflux for 4 hours. 10.5 g. of ethyl hydrazino carbonate are added and the mixture is kept under reflux for 4 hours. After the usual treatment, the non-crystalline carbethoxy amino guanidine is cyclized by boiling with 100 cc. of 4 N sodium hydroxide solution. After filtration in the presence of animal charcoal and acidification, there are obtained 5.7 g. of the hydroxy triazole, which is purified by recrystallization from a mixture of cyclohexane and ethyl acetate; the melting point of the compound is 130° C.

Analysis for $C_{14}H_{20}N_4O_2$ (276.33): Calculated percent—C=60.85, H=7.3, N=20.28. Found percent—C=61.07, H=7.5, N=20.36.

EXAMPLE 13

*3-hydroxy-4-p-ethoxy phenyl 5-diethylamino-1,2,4-triazole*

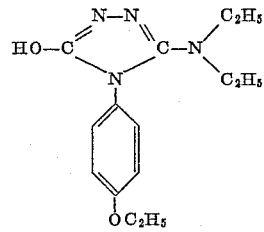

The $N_1$-p-ethoxy phenyl-$N_2$-diethyl-S-methyl-isothiourea is prepared by proceeding as described in the foregoing examples from 25 g. of $N_1$-p-ethoxy phenyl-$N_2$-diethyl thiourea in suspension in 40 cc. of water and 14 g. of methyl sulfate. 24 g. of reaction product are obtained, i.e. the yield is 90%. It has not been found possible to distill this isothiourea compound without decomposition. The indicated yield corresponds to the product obtained by evaporation of the ether after conventional isolation and purification.

The following mixture is heated at 140° C. for 6 hours (the reaction starting at 120° C.):

|   | G. |
|---|---|
| $N_1$-p-ethoxy phenyl-$N_2$-diethyl-S-methyl isothiourea | 24 |
| Ethyl hydrazino carbonate | 10.5 |
| Acetic acid | 6.3 |

After cooling, the crystalline mass is taken up in water, centrifuged, washed with water, then dissolved with heating in 120 cc. of 2 N sodium hydroxide solution; the resulting solution is filtered in the presence of animal charcoal and then acidified. A precipitate is formed, which is centrifuged, washed, and dried. 22 g. of the desired product are obtained, i.e. the yield is 88%. After recrystallization from a mixture of ethyl acetate and cyclohexane, the compound has a melting point of 132° C.

EXAMPLE 14

*3-hydroxy-N-4-p-ethoxy phenyl-5-pentamethylene amino-1,2,4-triazole*

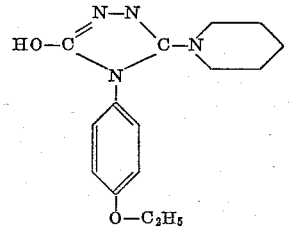

The procedure is as in Example 12, starting from:

| | |
|---|---|
| $N_1$-p-ethoxy phenyl-$N_2$-pentamethylene thiourea | g. 10.5 |
| Methyl sulfate | g. 5 |
| Methanol | cc. 50 |
| Ethyl hydrazino carbonate | g. 4.6 |

The non-crystalline intermediate carbethoxy amino guanidine is not purified but is cyclized as such by boiling with 50 cc. of 2 N sodium hydroxide solution.

The product is isolated as described in Example 11 and is purified by recrystallization from 50% methanol.

Its melting point is 164° C.

Analysis for $C_{15}H_{20}N_4O_2$ (288.4): Calculated percent—C=62.48, H=6.99, N=19.43. Found percent—C=62.42, H=7.06, N=19.04

EXAMPLE 15

*3-hydroxy-4-cyclohexyl-5-diethylamino-1,2,4-triazole*

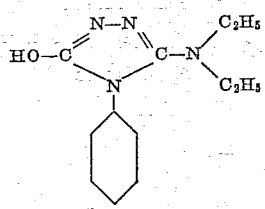

The $N_1$-cyclohexyl-$N_2$-diethyl thiourea required in this synthesis is prepared by condensation of cyclohexyl isothiocyanate and diethylamine. It has a melting point of 121° C.

16 g. (0.075 mole) of this thiourea compound are treated, as described in Example 12, with 13 g. of methyl sulfate. As soon as the reaction has subsided, the reaction product is taken up in 50 cc. of methanol and heated for 4 hours under reflux, whereupon an excess (23 g.=0.22 mole) of ethyl hydrazino carbonate is added. Heating under reflux is then continued for another 8 hours.

After the usual treatment, the crude carbethoxy amino guanidine is cyclized by boiling in 100 cc. of 4 N sodium hydroxide solution. The 3-hydroxy-4-cyclohexyl-5-diethyl-amino-1,2,4-triazole is isolated as described in the preceding examples and is purified by recrystallization from petroleum ether.

This compound has a melting point of 120–121° C.

Analysis for $C_{12}H_{22}N_4O$ (238.33): Calculated percent—C=60.47, H=9.3, N=23.51. Found percent—C=60.55, H=9.24, N=23.3

EXAMPLE 16

*3-hydroxy-4-cyclohexyl-5-diethylamino-1,2,4-triazole*

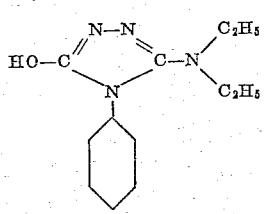

The $N_1$-cyclohexyl-$N_2$-diethyl-S-methyl isothiourea is prepared as described in Example 1 from 13 g. of $N_1$-cyclohexyl-$N_2$-diethyl thiourea in suspension in 20 cc. of water and 8.5 g. of methyl sulfate. 11 g. of $N_1$-cyclohexyl-$N_2$-diethyl-S-methyl isothiourea are obtained thereby, i.e. with a yield of 80%. Boiling point: 114–116° C./2 mm.

The following mixture is heated at 120–130° C. for 8 hours:

|   | G. |
|---|---|
| $N_1$-cyclohexyl-$N_2$-diethyl-S-methyl-isothiourea | 11 |
| Ethyl hydrazino carbonate (1 mole+10%) | 5 |
| Acetic acid | 3.5 |

After cooling, the mass is taken up in 50 cc. of 2 N sodium hydroxide solution; the resulting solution is filtered to remove a light, insoluble substance. By acidification with acetic acid, the solution yields an oil which crystallizes on being left in a refrigerator. The resulting solid is centrifuged, washed with water, and dried. 7.3 g. of the desired compound are obtained, i.e. the yield is 64%. After recrystallization from petroleum ether, the compound melts at 110° C., solidifies, and melts again at 118° C.

EXAMPLE 17

*3-hydroxy-4-cyclohexyl-N-3-pentamethylene amino-1,2,4-triazole*

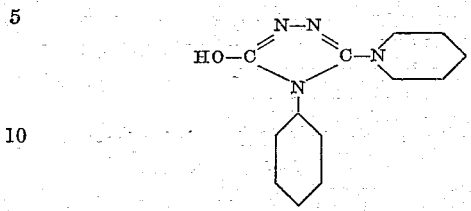

The $N_1$-cyclohexyl-$N_2$-pentamethylene thiourea (melting point: 132–134° C.) required in this synthesis is prepared by reaction of cyclohexyl isothiocyanate with piperidine.

The reaction, carried out as described in Example 15, yields 3-hydroxy-4-cyclohexyl-N-5-pentamethylene amino-1,2,4-triazole which is purified by recrystallization from ethyl acetate.

This compound has a melting point of 188° C.

Analysis for $C_{13}H_{22}N_4O$ (250.3): Calculated percent—C=62.27, H=8.86, N=22.38. Found percent—C=62.1, H=9.04, N=22.15.

EXAMPLE 18

*3-hydroxy-4-cyclohexyl-N-5-morpholino-1,2,4-triazole*

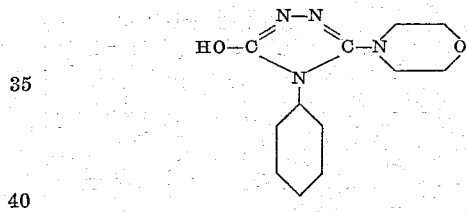

The cyclohexyl thiocarbamyl morpholine (melting point: 137° C.) required in this synthesis is prepared by condensation of cyclohexyl isothiocyanate and morpholine.

The reaction is carried out as described in Example 15. The 3-hydroxy-4-cyclohexyl-N-5-morpholino-1,2,4-triazole, melts at 176–178° C., after recrystallization from a mixture of ethyl acetate and petroleum ether.

Analysis for $C_{12}H_{20}N_4O_2$ (252.3): Calculated percent—C=57.11, H=7.99, N=22.21. Found percent—C=57.22, H=7.96, N=22.26.

EXAMPLE 19

*$N_1$-phenyl-$N_2$-dimethyl-$N_3$-methyl dithiocarbamido guanidine*

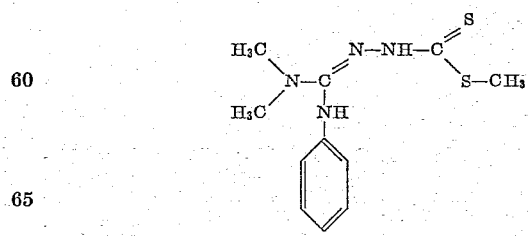

18 g. (1/10 mole) of $N_1$-phenyl-$N_2$-dimethyl thiourea and 13 g. of methyl sulfate are mixed in a 500 cc. flask equipped with a reflux condenser. As soon as the reaction has subsided, 100 cc. of methanol are added and heating under reflux is carried out for 4 hours. 13.5 g. of methyl hydrazino dithiocarbamate are then added and heating is continued for four more hours under reflux. The solvent is removed by evaporation in vacuo, the residue is dissolved in 150 cc. of water; the solution is filtered with animal charcoal and then made alkaline with ammonia. The precipitate is extracted with ether; the solution is dried over magnesium sulfate, the solvent is evaporated, and the residue is recrystallized from methanol.

10.5 g. of a product which melts at about 172° C. with decomposition are obtained.

Analysis for $C_{11}H_{16}N_4S_2$ (268.3): Calculated percent—C=49.25, H=6.01, N=20.83, S=23.86. Found percent—C=49.63, H=5.66, N=21.09, S=23.7.

EXAMPLE 20

*3-mercapto-4-phenyl-5-dimethylamino-1,2,4-triazole*

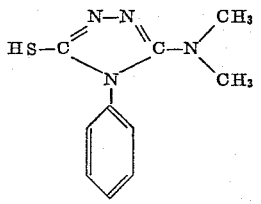

9 g. of methyl dithiocarbamido guanidine prepared according to Example 19 and 50 cc. of 2 N sodium hydroxide solution are heated under reflux, whereby rapid dissolution takes place. After boiling for 2 hours, the cooled solution is acidified with acetic acid, the precipitate is centrifuged, washed, and dried.

8 g. of a product which melts at 185° C. after recrystallization from ethanol, are obtained.

Analysis for $C_{10}H_{12}N_4S$ (220.23): Calculated percent—C=54.54, H=5.69, N=25.44, S=14.53. Found percent—C=55.01, H=5.73, N=25.57, S=15.00.

EXAMPLE 21

*N-phenyl-N₂-diethylene oxy-N₃-methyl dithiocarbamido guanidine*

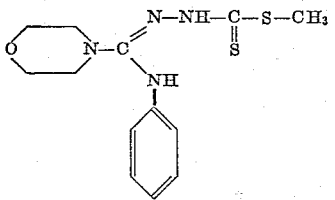

This compound is prepared according to Example 19, starting from phenyl thiocarbamyl morpholine (22 g., 1/10 mole), methyl sulfate (13 g.), and methyl hydrazino dithiocarbonate (13.5 g.). Purification is effected by recrystallization from alcohol.

The compound melts at 180° C. with decomposition. Analysis for $C_{13}H_{18}N_4OS_2$ (310.31): Calculated percent—C=50.31, H=5.85; N=18.06, S=20.64. Found percent—C=50.2, H=5.94, N=18.13, S=20.17.

EXAMPLE 22

*3-mercapto-4-phenyl-N-5-morpholino-1,2,4-triazole*

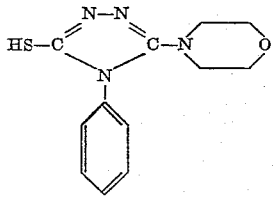

A mixture of methyl dithiocarbamido guanidine (5.2 g.) prepared according to Example 21 and 2 N sodium hydroxide solution (50 cc.) is heated under reflux for 3 hours.

After cooling, the solution is acidified, the precipitate is centrifuged and dried. 4.2 g. of a product are obtained which is purified by recrystallization from methanol.

Its melting point is 248° C.

Analysis for $C_{12}H_{14}N_4OS$ (262.26): Calculated percent—C=54.95, H=5.38, N=21.37, S=12.2. Found percent—C=55.01, H=5.4, N=21.41, S=12.02.

EXAMPLE 23

*3-mercapto-4-phenyl-N-5-morpholino-1,2,4-triazole*

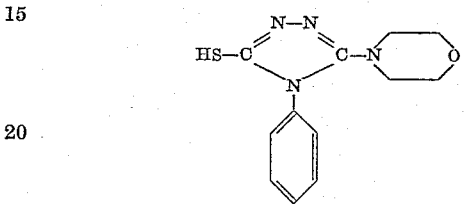

A suspension of 22 g. of phenyl thiocarbamido morpholine (1/10 mole) in 40 cc. of water is prepared and stirred vigorously. 14 g. (1/10 mole+10%) of methyl sulfate are added all at once thereto and the solution is progressively heated to its boiling point. During heating, the thiourea dissolves. After cooling, the slightly cloudy solution is extracted with ether and then made alkaline with ammonia. The solid precipitate is centrifuged, washed with water, and dried. 14.2 g. of N₁-phenyl-N₂-diethylene oxy-S-methyl isothiourea are thus obtained, i.e. the yield is 60%. It is purified by recrystallization from alcohol. Melting point: 91° C.

Analysis for $C_{12}H_{16}N_2OS$ (236.26): Calculated percent—S=61.00, H=6.83, N=11.86. Found percent—C=61.15, H=6.91, N=11.61.

A mixture of 5.9 g. of N₁-phenyl-N₂-diethylene oxy-S-methyl isothiourea, 3.5 g. of methyl hydrazino dithiocarbonate, and 1.75 cc. of acetic acid is heated at 120–130° C. for 6 hours. After cooling, the solid mass and 50 cc. of 2 N sodium hydroxide solution are brought to boiling. After being cooled again, an oily, insoluble product is extracted with ether. The solution is acidified with acetic acid yielding a precipitate which initially is oily but crystallizes on standing and scratching; it is centrifuged. 2.2 g. of a product are obtained which is recrystallized from alcohol. Melting point: 242° C. This melting point is not decreased on mixing with 3-mercapto-4-phenyl-5-N-morpholino-1,2,4-triazole prepared according to the above-given Example 22.

EXAMPLE 24

*N₁-phenyl-N₂-diethyl-N₃-methyl dithiocarbamido guanidine*

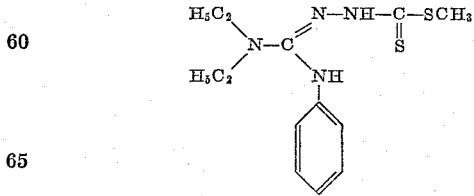

This product is prepared as described in Example 19 by starting from N₁-phenyl-N₂-diethyl thiourea (20 g.) and methyl sulfate (13 g.). Purification is effected by recrystallization from methanol.

The compound melts at 146° C.

Analysis for $C_{13}H_{20}N_4S_2$ (296.32): Calculated percent—C=52.69, H=6.80, N=18.91. Found percent—C=53.25, H=6.84, N=18.90.

EXAMPLE 25

*3-mercapto-4-phenyl-5-diethylamino-1,2,4-triazole*

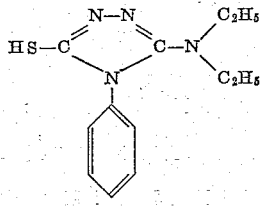

9 g. of the compound described in Example 24 and 50 cc. of 2 N sodium hydroxide solution are heated under reflux for 90 minutes. After filtration, the solution is acidified with acetic acid and the centrifuged precipitate is recrystallized from a mixture of methanol and water.

The resulting compound melts at 211° C.

Analysis for $C_{12}H_{16}N_4S$ (248.28): Calculated percent— C=58.05, H=6.50, N=22.57. Found percent— C=58.17, H=6.59, N=22.69.

EXAMPLE 26

A mixture of phenyl thiocarbamido morpholine (22 g.), ethyl bromide (24 g.), and alcohol (50 cc.) is heated at 130° C. in an autoclave for 3 hours.

After cooling, the hydrobromide of S-ethyl phenyl isothiocarbamido morpholine crystallizes. It is purified by recrystallization from alcohol.

Analysis of this hydrobromide: Calculated—Br= 23.2%. Found—Br=23%.

1 g. of the aforesaid hydrobromide is dissolved in the minimum quantity of water, the solution is made alkaline with sodium hydroxide solution and the resulting oil is extracted with ether; the ethereal solution is dried over sodium sulfate and the solvent is distilled off. The residual oil (0.75 g.) is dissolved in 30 cc. of butanol and 2 g. of methyl hydrazino dithiocarbonate are added. The solution is heated under reflux for 7 hours and the solvent is distilled off in vacuo. The residue, taken up in water, gives a precipitate of a gum-like product, which crystallizes on addition of methanol. It is purified by recrystallization from methanol. The resulting product melts at 248° C.; this melting point is not changed on mixing with the 3-mercapto-4-phenyl-5-morpholino-1,2,4-triazole prepared according to Example 22.

EXAMPLE 27

*3-hydroxy-4-p-chloro phenyl-5-diethylamino-1,2,4-triazole*

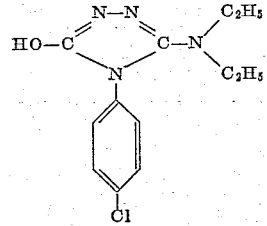

A suspension of 25 g. of $N_1$-p-chloro phenyl-$N_2$-diethyl thiourea in 25 cc. of methanol is prepared while stirring; 16 g. of methyl sulfate are added, as in Example 2. After the usual treatment, 20 g. of $N_1$-p-chloro phenyl-$N_2$-diethyl-S-methyl isothiourea are obtained, i.e., the yield is 77%. Boiling point: 135–139° C./1 mm.

A mixture of 26 g. of the aforesaid isomethyl thiourea, 12.5 g. of ethyl hydrazino carbonate, and 7.5 cc. of acetic acid is heated at 125° C. for 6 hours. During heating, the reaction product crystallizes. After cooling, the solid mass is taken up in 100 cc. of water, centrifuged, washed with water, and then taken up in an alkaline solution (NaOH=15 g., water=250 cc.); the solution is brought to its boiling point, filtered through animal charcoal, and acidified with 22 cc. of acetic acid while still hot. The precipitate is centrifuged, washed with water, and dried. 22 g. of the desired compound are obtained, the yield is 85%. This compound, purified by recrystallization from benzene, melts at 158° C.

Analysis for $C_{12}H_{15}ClN_4O$ (266.5): Calculated percent—C=54.03, H=5.62, N=21.01, Cl=13.32. Found percent—C=54.08, H=5.26, N=21.28, Cl=13.18.

EXAMPLE 28

*3-hydroxy-4-m-chloro phenyl-5-diethylamino-1,2,4-triazole*

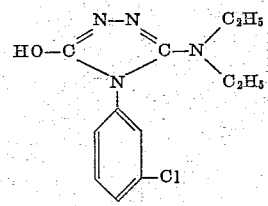

The $N_1$-m-chloro phenyl-$N_2$-diethyl-S-methyl isothiourea is prepared as described in the preceding examples from a solution of 57 g. of $N_1$-m-chloro phenyl-$N_2$-diethyl thiourea in 30 cc. of methanol and 36 g. of methyl sulfate. After the usual treatment, 52 g. of $N_1$-m-chloro phenyl-$N_2$-diethyl-S-methyl isothiourea are obtained in the form of an oil, the yield thus being 86.6%. Boiling point: 140–143° C./1.2 mm.

52 g. of $N_1$-m-chloro phenyl-$N_2$-diethyl-S-methyl isothiourea, 25 g. of ethyl hydrazino carbonate, and 15 g. of acetic acid are heated at 120° C. for 6 hours. After cooling, the viscous mass is triturated with 200 cc. of water whereby it solidifies. It is centrifuged, washed with water, and is taken up in an alkaline solution (NaOH=15 g., water=250 cc.); the resulting solution is heated to boiling, filtered on animal charcoal, and acidified. 47 g. of the triazole (with a yield of 87%) are obtained. This triazole is purified by recrystallization from cyclohexane. The purified product melts at 94–96° C.

Analysis for $C_{12}H_{15}ClN_4O$ (266.5): Calculated percent C=54.03, H=5.52, N=21.01, Cl=13.32. Found percent—C=53.97, H=5.33, N=20.72, Cl=13.3.

EXAMPLE 29

*3-hydroxy-4-phenyl-5-N-pyrrolidino-1,2,4-triazole*

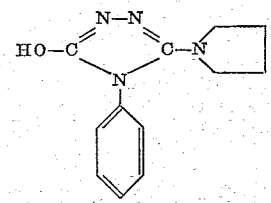

The $N_1$-phenyl-$N_2$-tetramethylene-S-methyl isothiourea is prepared as described in the preceding examples from a suspension of 50 g. of $N_1$-phenyl-$N_2$-tetramethylene thiourea in 100 cc. of methanol and 37 g. of methylsulfate. 48 g. of an oil boiling at 151° C./1.5 mm. are obtained, the yield thus being 89%.

The mixture of 48 g. of $N_1$-pheny-$N_2$-tetramethylene-S-methyl isothiourea, 27 g. of ethyl hydrazino carbonate, and 16 cc. of acetic acid is heated on an oil bath at 120–130° C. for 7 hours. After cooling, the mass crystallizes. The solid residue is triturated with 200 cc. of water and centrifuged; it is washed with water and the solid product is taken up in a solution of 12 g. of sodium hydroxide in 250 cc. of water; it is heated to boiling and filtered in the presence of animal charcoal. The filtrate is acidified with 18 cc. of acetic acid. The resulting precipitate is contrifuged, washed with water, and dried. 30 g. of the desired hydroxy triazole are obtained, i.e. the yield is 60%, and this triazole is purified by recrystallization from aqueous methanol. Melting point: 234° C.

Analysis for $C_{12}H_{14}N_4O$ (230.26): Calculated percent—C=62.59, H=6.13, N=24.33. Found percent—C=62.58, H=6.06, N=24.39.

The therapeutic activity of the compounds is illustrated by the hereinafter given pharmacodynamic study of the compounds:

The acute toxicity was determined by intraperitoneal administration:

Each of the compounds suspended in a solution of gum arabic was administered to several groups of ten male mice receiving increasing doses with volumes varying from 0.2 cc. to 0.5 cc. per 20 g. The $LD_{50}$ after 48 hours was calculated according to the formula of Karber and Behrens.

The effect upon the central nervous system was then studied.

In order to determine the depressive effect on spontaneous motility (DMS), the mice are placed separately in a bag of plastic material suspended from a spring, the movements of which are directly engraved on a smoked cylinder. The animals which exhibit clearly diminished amplitude and the frequency of the movements for 30 minutes after injection of the compound intraperitoneally, are considered as subjected to a sedative action and the percentage of animals in which the test is positive is noted.

In order to determine the sedative action on the reflexes, the traction test (TT) is carried out (see Courvoisier et al., Journ. Exper. Psychopathol. 17, 1956–25).

Any animal which does not succeed in reestablishing itself on a horizontally stretched wire within at least five seconds is considered as having been subjected to a sedative action.

The compound to be studied is administered intraperitoneally to a group of 10 mice, thirty minutes before the test, and the percentage of animals in which the test is positive is noted.

The Rota Rod Test (RR) which test consists in determining the period of time during which the mice are able to maintain themselves on a spindle turning at slow speed (10 r.p.m.) was also used. According to this test the mice are tested 15, 30, 60, and 120 minutes after intraperitoneal administration of the compound to be tested and the average period during which the mice are capable to hold on to the rod is determined; in the following table +++ indicates 0 to 1 min.,
++ indicates 1 to 2 min.,
+ indicates 2 to 3 min.

The protective action of the compounds against the toxic effect of pentetrazol (AP) was also studied.

Pentetrazol is a convulsant and is fatal to 100% of the mice in a dose of 120 mg./kg. The percentage of mice which survive this dose of pentetrazol when receiving intraperitoneally the compound to be tested 30 minutes prior to the pentetrazol administration is noted.

Furthermore, the preventative action of the product with respect to motor disturbances caused by imino dipropionitrile (AI) was determined, thereby using the technique described by Thuillier in "Psychotropic Drugs," p. 138 (Garattini and Ghetti, Elsevier Publ. Co., 1957). Imino dipropionitrile causes motor disturbances in mice, which are shown by a constant movement in a circular path. The compound to be studied was administered intraperitoneally to a group of ten of such "turning" mice. Complete or partial arrest of the circular motion was noted; a complete arrest within 30 minutes is indicated in the following table by +++.

Tests were also carried out with respect to the toxic action of nicotine (ANi).

Nicotine applied intravenously in a dose of 1.25 mg./kg. causes convulsive crises in mice and finally results in death. The derivative to be studied is injected intrapertioneally, 30 minutes before the nicotine administration, to a group of 10 mice; if they do not all die, groups of mice are injected with increasing nicotine doses, equal to two times, three times or more times of the $LD_{100}$. The result is expressed in the following table as the number of $LD_{100}$ necessary to kill 100% of the previously treated mice whereby +++ indicates 6 to 7 times the $LD_{100}$,
++ indicates 4 to 5 times the $LD_{100}$,
+ indicates 2 to 3 times the $LD_{100}$.

The hypnotic action (H) has also been studied.

This test was carried out on groups of ten mice (5 males and 5 females).

The animals which have recovered the capacity for standing on their four paws when they are placed on their backs are considered as "revived" (righting reflex).

Furthermore, there has also been determined the potentiation of hypnosis (PH) (see Courvoisier, Arch. Int. Pharmacodyn. 92, 1953, p. 305) by testing the effect on experimental sleep induced by hexobarbital.

The barbiturate in a non-hypnotic dose (20 mg./kg.) is administered subcutaneously to a group of ten mice treated with the triazole derivative to be studied, in a non-hypnotic dose.

The average duration of the hypnosis is observed. The results are indicated as follows in the table given hereinafter:

+++ indicates 30 to 60 min.,
++ indicates 20 to 30 min.,
+ indicates 10 to 20 min. duration of hypnosis.

Tests were also carried out to determine the effect of the new compounds on the anesthetic sleep caused by ether (PE).

Two groups of ten mice, one group of which has received the compound to be studied by intraperitoneal injection, are placed in a chamber saturated with ether vapors for 8 minutes.

The average duration of the hypnosis of the control mice and the treated mice is compared, and the difference is noted in the table as follows:

+++ indicates a duration of less than ⅓,
++ indicates a duration from ⅓ to ½, and
+ indicates a duration from ½ to 1 of the hypnosis of the control mice.

The antihistaminic activity (AAH) has also been examined by determining the protective effect of the new compounds against bronchospasms due to histamine (b.s.) (Halpern, Arch. Intern. Pharm. 1942, 68, 339) and contraction of the isolated guinea pig ileum (il).

Finally, the cardiovascular activity was examined (ACV) on dogs treated with chloralose:

The compounds were administered intravenously and their action on the carotoid pressure was demonstrated by the conventional technique.

The following table sets out the results obtained in the different tests for a certain number of triazole compounds, which are numbered as follows:

1. 3-hydroxy-4-phenyl-5-diethylamino-1,2,4-triazole.
2. 3-hydroxy-4-cyclohexyl-5-diethylamino-1,2,4-triazole.
3. 3-hydroxy-4-p-ethoxy phenyl-5-diethylamino-1,2,4-triazole.
4. 3-hydroxy-4-m-chloro phenyl-5-diethylamino-1,2-4-triazole.
5. 3-hydroxy-4-p-chloro phenyl-5-diethylamino-1,2,4 - triazole.
6. 3-hydroxy-4-N-phenyl-5-pyrrolidino-1,2,4-triazole.
7. 3-mercapto-4-phenyl-5-dimethylamino-1,2,4-triazole.
8. 3-mercapto-4-N-phenyl-5-morpholino-1,2,4-triazole.
9. 3-mercapto-4-phenyl-5-diethylamino-1,2,4-triazole.

TABLE

| Compound | LD₅₀, mg./kg. | DMS | TT | RR | AP | AI |
|---|---|---|---|---|---|---|
| 1 | 410 | 80% a per os | 80% a | ++ a | 60% a | +++ a |
| 2 | 390 | 100% | | +++ a | 40% a | +++ |
| 3 | 310 | 0 a | | ++ a | 10% a | |
| 4 | 475 | | 20% a | ++ a | 0 a | |
| 5 | 370 | 80% a | 90% a | + a | 60% a | |
| 6 | 640 | 50% b | 30% b | + b | 80% b | |
| 7 | >500 | | 0 b | + b | Death delayed. b | |
| 8 | >500 | 40% b | 0 b | 0 b | 0 b | |
| 9 | >500 | | 0 b | 0 b | 10% b | |

| Compound | ANi | PH | PE | H | AAH | AAH | ACV |
|---|---|---|---|---|---|---|---|
| 1 | +++ a | +++ a | ++ a | Appears at about 150 mg./kg. | + | + | Hypotension. |
| 2 | ++ | ++ | + | At lethal doses. | + | + | Hypotension. |
| 3 | + a | + a | 0 a | Appears at about 200 mg./kg. | | | |
| 4 | ++ a | +++ a | +++ a | DH 50 150–200 mg./kg. | | | Hypotension. |
| 5 | ++ a | ++ a | + a | DH 50 150–200 mg./kg. | | | |

In this table, the different tests are indicated by the initials hereinbefore referred to and the letters $a$ and $b$ correspond to doses administered intraperitoneally, where nothing specific is said on this subject:

$a = 100$ mg./kg.
$b = 200$ mg./kg.

What I claim is:
1. 3-hydroxy-4-phenyl-5-diethylamino-1,2,4-triazole.
2. 3-hydroxy-4-cyclohexyl-5-diethylamino-1,2,4-triazole.
3. 3-hydroxy-4-phenyl-5-N-pyrrolidino-1,2,4-triazole.
4. The triazole compound of the formula

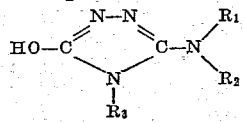

wherein
  $R_1$ and $R_2$ are members selected from the group consisting of lower alkyl and $R_1$ and $R_2$, together with the nitrogen atom to which they are attached, form the piperidine, pyrrolidine, and morpholine ring, while
  $R_3$ is a member selected from the group consisting of phenyl, cyclohexyl, chloro, phenyl, and phenyl substituted by an alkoxy group with less than three carbon atoms.

5. 3-hydroxy-4-(p-ethoxy phenyl)-5-diethylamino-1,2,4-triazole.

6. In a process of producing a triazole compound of the formula

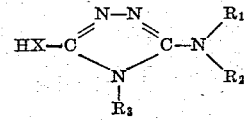

wherein
  $R_1$ and $R_2$ are members selected from the group consisting of lower alkyl and $R_1$ and $R_2$, together with the nitrogen atom to which they are attached, form the piperidine, pyrrolidine, and morpholine ring, while
  $R_3$ is a member selected from the group consisting of phenyl, cyclohexyl, chloro phenyl, and phenyl substituted by an alkoxy group with less than three carbon atoms and
  X is a member selected from the group consisting of sulfur and oxygen,
the steps which comprise condensing a hydrazine compound of the formula

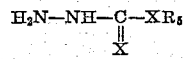

wherein
  X is a member selected from the group consisting of sulfur and oxygen, while
  $R_5$ is lower alkyl,
with a urea compound of the formula

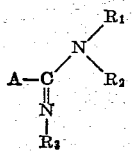

wherein
  $R_1$, $R_2$, and $R_3$ represent the same members as indicated above, while
  A is a member selected from the group consisting of lower alkyl mercapto and the group of the formula
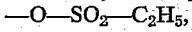

in a solvent to form the amino guanidine compound of the formula

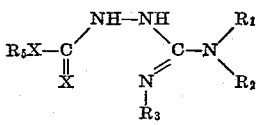

wherein
$R_1$, $R_2$, $R_3$, $R_5$, and X represent the same members as indicated above, and heating to boiling said amino guanidine compound in aqueous alkali metal hydroxide solution to cause cyclization to the triazole compound.

7. In a process of producing a triazole compound of the formula

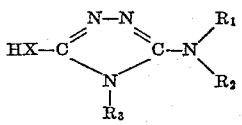

wherein
$R_1$ and $R_2$ are members selected from the group consisting of lower alkyl and $R_1$ and $R_2$, together with the nitrogen atom to which they are attached, form the piperidine, pyrrolidine, and morpholine ring, while $R_3$ is a member selected from the group consisting of phenyl, cyclohexyl, chloro phenyl and phenyl substituted by an alkoxy group with less than three carbon atoms and X is a member selected from the group consisting of sulfur and oxygen the steps which comprise heating to boiling an amino guanidine compound of the formula

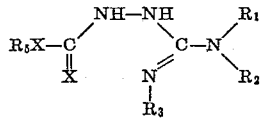

wherein
$R_1$, $R_2$, $R_3$ and X represent the same members as indicated above, while
$R_5$ is lower alkyl, in an aqueous alkali metal hydroxide solution to cause cyclization to the triazole compound and acidifying the resulting alkaline solution to precipitate the triazole compound.

References Cited by the Examiner
UNITED STATES PATENTS 2,763,661  9/56  Grundmann et al. _____ 260—308
2,825,716  3/58  D'Alelio _____ 260—308

FOREIGN PATENTS
741,228  3/55  Great Britain.

IRVING MARCUS, *Primary Examiner.*
WALTER A. MODANCE, *Examiner.*